Feb. 5, 1952   J. A. WAGSTAFF   2,584,646
COMBINED AUTOMOBILE TRAY AND
RECEPTACLE-SUPPORTING DEVICE

Filed Oct. 21, 1949   3 Sheets-Sheet 1

INVENTOR
JAMES A. WAGSTAFF,
BY
McMorrow, Burman & Davidson
ATTORNEYS

Feb. 5, 1952 J. A. WAGSTAFF 2,584,646
COMBINED AUTOMOBILE TRAY AND
RECEPTACLE-SUPPORTING DEVICE
Filed Oct. 21, 1949 3 Sheets-Sheet 2
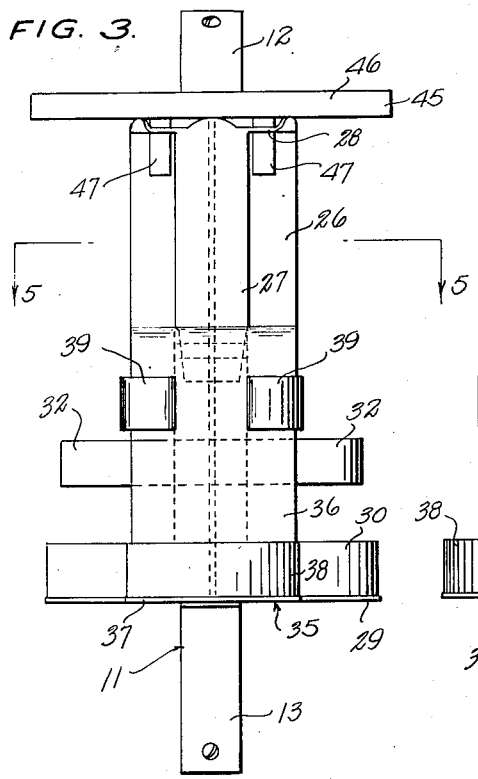
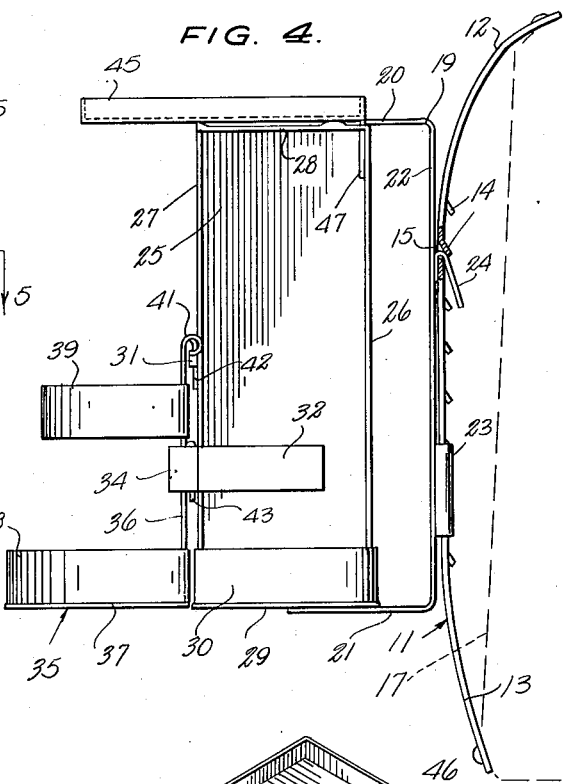
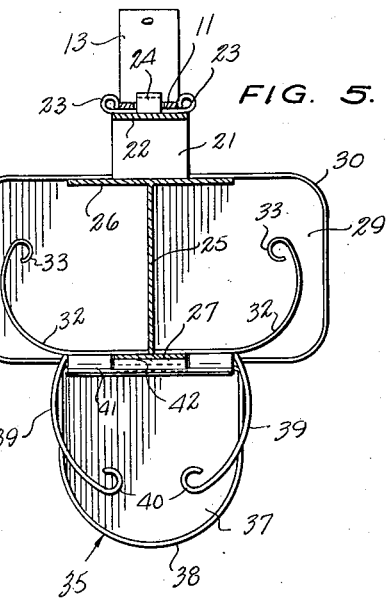
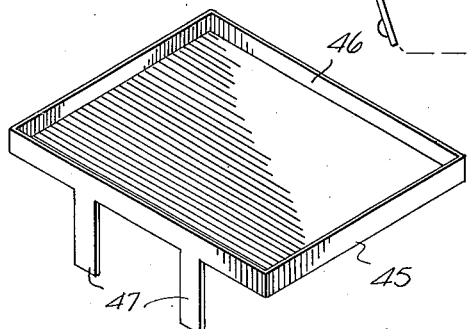
INVENTOR
JAMES A. WAGSTAFF,
BY McMorrow, Berman & Davidson
ATTORNEYS Feb. 5, 1952
J. A. WAGSTAFF
2,584,646
COMBINED AUTOMOBILE TRAY AND
RECEPTACLE-SUPPORTING DEVICE
Filed Oct. 21, 1949
3 Sheets-Sheet 3
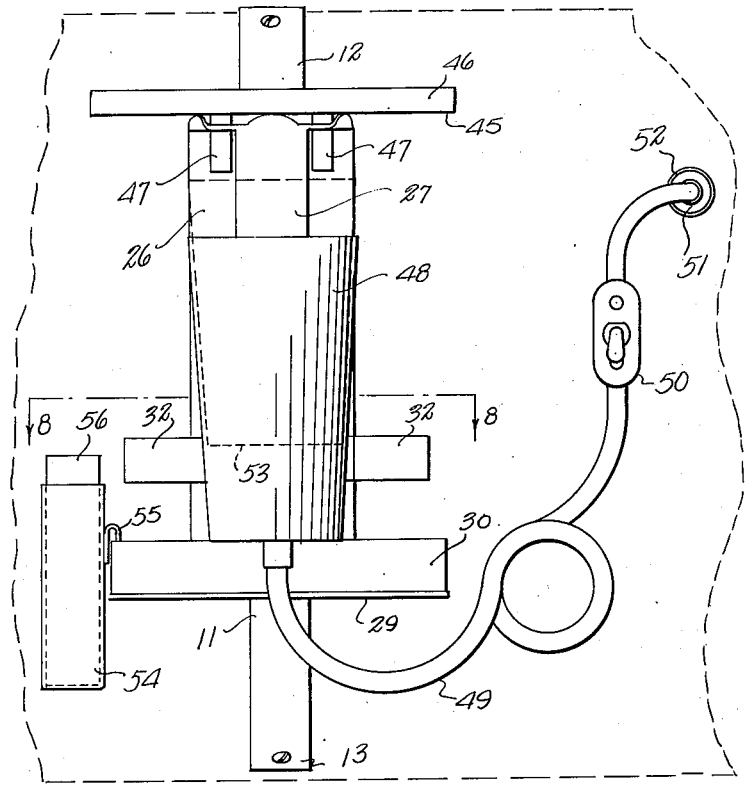
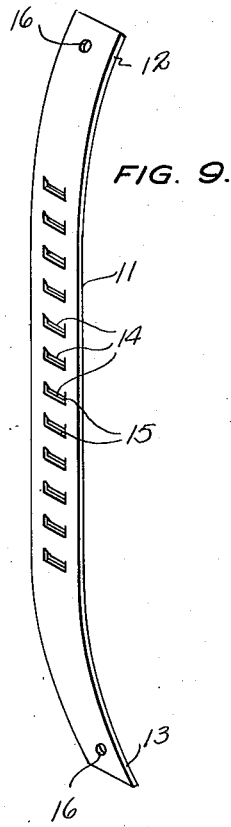
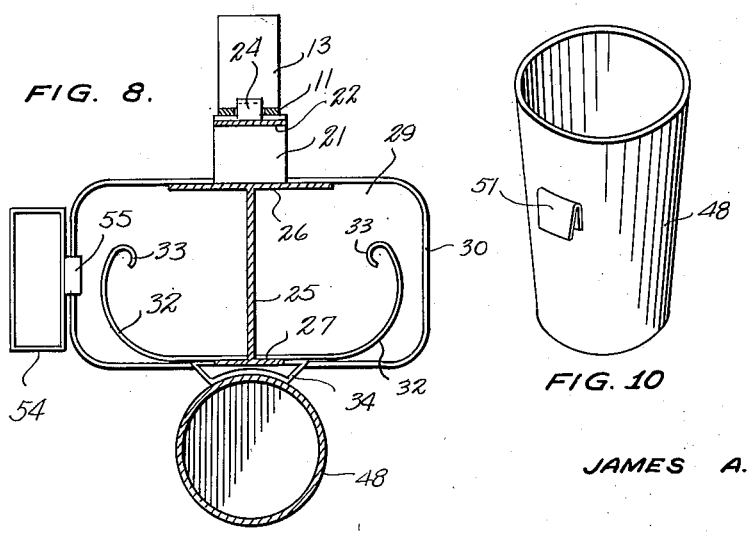
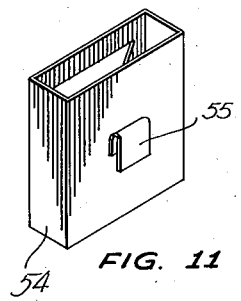
INVENTOR
JAMES A. WAGSTAFF,
BY
McMorrow, Berman & Davidson
ATTORNEYS Patented Feb. 5, 1952

2,584,646

UNITED STATES PATENT OFFICE 2,584,646

COMBINED AUTOMOBILE TRAY AND RECEPTACLE-SUPPORTING DEVICE

James A. Wagstaff, Roanoke, Va.

Application October 21, 1949, Serial No. 122,645

7 Claims. (Cl. 224—42.42)

This invention relates to supports, and more particularly to a combination tray and receptacle-supporting device for use in vehicles, such as in automobiles.

A main object of the invention is to provide a novel and improved support device for use in automobiles and other motor vehicles, such device being very simple in construction, being very easy to install, and being adapted to support bottled beverages, smokers' articles, and other objects within easy reach of the occupants of the automobile.

A further object of the invention is to provide an improved article-supporting device for use in automobiles, said device being very inexpensive to manufacture, being readily attached to and detached from the automobile, being neat in appearance, being compact in size, and being rugged in construction.

Further objects and advantages of the invention will become apparent from the following description and claims, and from the accompanying drawings, wherein:

Figure 3 is an enlarged front elevational detail view of the support device employed in Figure 1;

Figure 4 is a side elevational view of the support device illustrated in Figure 3;

Figure 5 is a horizontal cross-sectional view taken on line 5—5 of Figure 3;

Figure 6 is a perspective view of the detachable tray element employed with the support device of Figure 3;

Figure 7 is a front elevational detail view similar to Figure 3, but showing a liquid heater mounted on the support device and showing a cigarette holder attached to said device;

Figure 8 is a horizontal cross-sectional view taken on line 8—8 of Figure 7;

Figure 9 is an enlarged perspective detail view of the supporting bracket employed to mount the support device at a desired location in the interior of the vehicle passenger compartment;

Figure 10 is a perspective view of the liquid heater employed in Figure 7;

Figure 11 is a perspective view of the cigarette holder employed in Figure 7.

Figure 1:
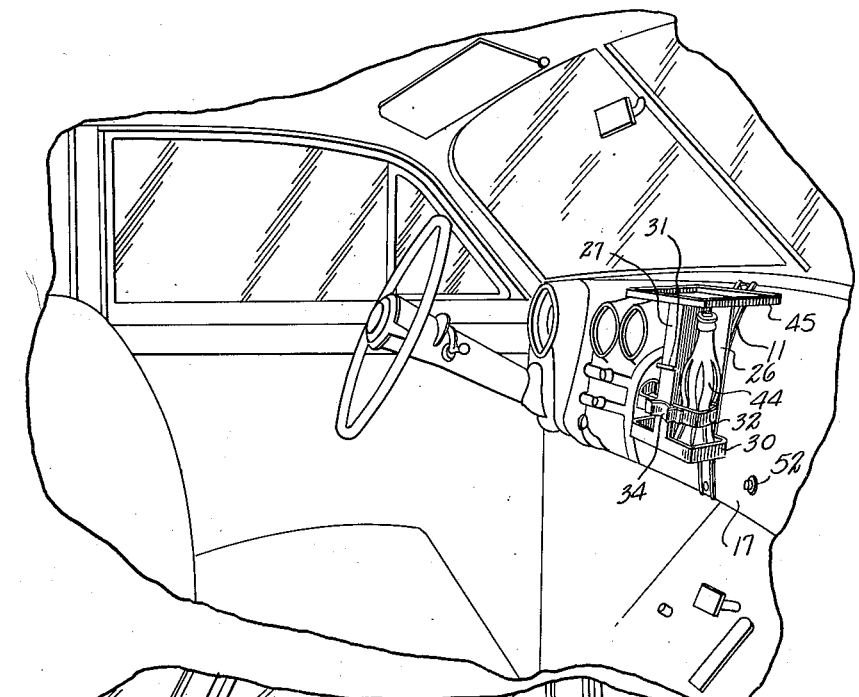
Figure 1 is a fragmentary perspective view of the interior of the forward portion of an automobile passenger compartment, showing a support device according to the present invention mounted on the dashboard of the automobile.

Referring to the drawings, and more particularly to Figures 3, 4, 5, 6 and 9, 11 designates a supporting strap, of any suitable material, preferably of resilient metal, said strap being formed with curved ends 12 and 13 and being formed along its body with inwardly-pressed tongues 14 defining spaced horizontal slots 15, as viewed in Figure 9. The curved ends 12 and 13 are formed with apertures 16, whereby said ends may be secured to any desired portion of the interior of the passenger compartment of a vehicle, for example, to a vehicle dashboard 17, or to the rear portion of the front seat of the vehicle, shown at 18 in Figure 2. The strap member 11 is sufficiently flexible to permit the ends 12 and 13 to be bent to conform with the contour of the surface to which said strap is attached. As shown in Figure 2, the strap member 11 may be bent so that the upper portion of the body of said strap member is substantially vertical, and similarly, said strap member may be arranged as in Figure 1 to provide a substantially vertical portion at the main body of the strap member.

Referring now to Figures 3, 4 and 5, 19 designates a bracket formed of bar stock and bent to define top and bottom arms 20 and 21 and a vertical main arm 22. Secured to the lower portion of the vertical arm 22 are opposing marginal spring clips 23, 23 adapted to lockingly embrace the strap 11 in the manner shown in Figures 4 and 5, and secured to the upper portion of the arm 22 is a downwardly-directed hook element 24 engageable in a selected slot 15 of the strap 11, whereby the bracket 19 is releasably secured to and supported on the strap 11. Designated at 25 is a vertical plate member formed with a vertical rear flange 26 and a vertical front flange 27, and formed with horizontal top and bottom flanges 28 and 29, secured respectively to the top and bottom arms 20 and 21 of the bracket 19. The bottom member 29 is generally rectangular in shape, as shown in Figure 5, and is formed with an upstanding, peripheral flange 30 defining a marginal wall around the member 29. Secured to the front vertical flange 27 at its intermediate portion is a horizontal U-shaped bracket 31. Secured to the inside surface of the vertical front flange 27 below the bracket 31 are respective curved, horizontal spring arms 32, 32 formed at their ends with rounded beads 33, 33. Secured to the arms 32, 32 adjacent the vertical flange 27 is a saddle-shaped, outwardly-facing bracket member 34.

Designated generally at 35 is an auxiliary support attachment comprising a vertical arm 36 having secured to its lower end a horizontal shelf 37 provided with the upstanding peripheral wall 38, and secured to the upper portion of the arm 36 are the respective curved, inwardly-opposing, horizontal spring arms 39, 39, each spring arm 39 being formed at its free end with a smoothly-curved bead 40. The arm 36 is formed at its top end with a horizontal, rolled bead 41 which is formed at its intermediate portion with a downwardly-extending, flat, vertical finger 42, said finger 42 being engageable in the U-bracket 31 in the manner shown in Figure 4. The intermediate portion of the vertical arm 36 has secured thereto horizontally-spaced, downwardly-directed, vertical hook arms 43 adapted to engage in the end portions of the saddle-shaped bracket member 34. As shown in Figure 4, the auxiliary support member 35 may be supported on the front vertical flange 27 by engaging the upper hook member 42 in the bracket 31 and by engaging the lower hook members 43 in the saddle-shaped bracket 34. In this position the shelf 37 is substantially in the same horizontal plane as the bottom flange 29 of the vertical plate member 25.

Figure 2:
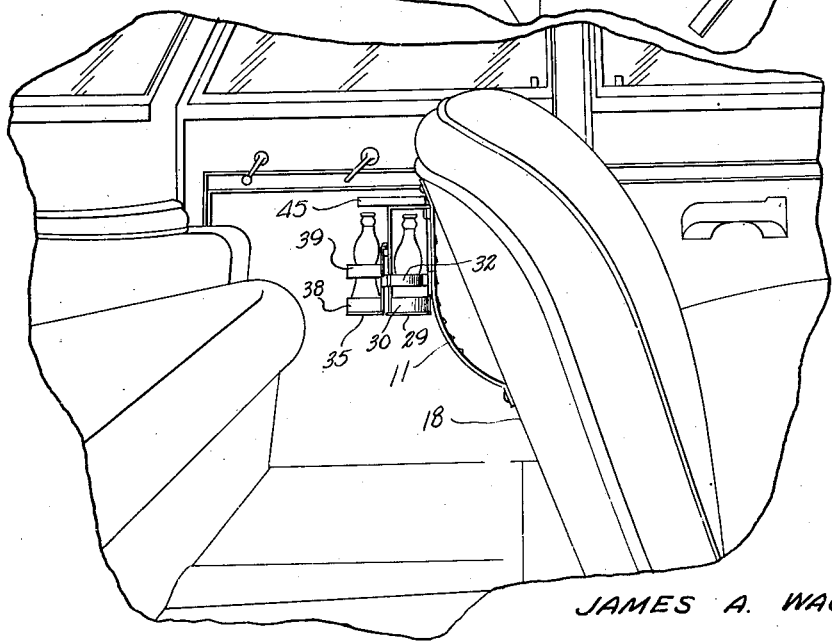
Figure 2 is a perspective view of the rear portion of the passenger compartment of the automobile of Figure 1, showing a supporting device according to the present invention mounted on the rear of the front seat of the automobile.

Referring to Figures 1 and 2, it will be seen that bottled beverages, for example, a bottle 44, may be supported in the main portion of the device in the manner shown in Figure 1, the bottle being resiliently clamped and held by a clamping arm 32 on the horizontal flange 29 adjacent the vertical flange 25. Two bottles may thus be supported in the main portion of the device. An additional bottle may be supported by engaging the auxiliary support member 35 on the vertical front flange 27 in the manner shown in Figure 4, whereby the additional bottle may be mounted in the auxiliary member in the manner shown in Figure 2, wherein the bottle is resiliently clamped by the spring arms 39, 39.

Designated at 45 is a rectangular tray member having a peripheral wall 46 and formed at its rear margin with spaced depending fingers 47, 47. The bracket 19 is formed at the bend between vertical arm 22 and top arm 20 with spaced slots adapted to receive the depending fingers 47, 47 of the tray member 45. As shown in Figures 3 and 4, the tray member 45 may be mounted on the horizontal top flange 28 with the fingers 47, 47 engaged in the slots above described, with the fingers 47, 47 bearing against the vertical arm 26 and with the tray member 45 held in position by gravity.

Referring now to the form of Figures 7 and 8, such form differs over the form previously described in that a receptacle designated by the numeral 48 replaces the auxiliary attachment support 35, and the bottom flange 29 of the vertical plate member 25 supports a container 54. The receptacle 48 is provided in its lower portion with an electrical heating element, said element being connected to a line cord 49 provided with a switch 50. The receptacle 48 is provided with a hook bracket 51 which may be engaged with the U-bracket 31 carried by vertical flange 27, whereby the heating receptacle 48 is supported on said front flange 27 forwardly adjacent thereto. The line cord 49 is provided with a suitable plug 51 which may be inserted in a suitable jack, such as shown at 52 in Figure 1, connected to the vehicle battery. Receptacle 48 may be employed for heating a beverage contained in a receptacle, such as the receptacle shown in dotted view at 53 in Figure 7.

Referring to Figures 7 and 11, 54 designates a container adapted to receive a package of cigarettes or the like, said container being provided at its rear wall with a hook bracket 55 adapted to engage over the peripheral wall 30 of the bottom flange 29 in the manner shown in Figure 7, whereby said receptacle is releasably connected to and supported on said wall 30. As shown in Figure 7, receptacle 54 may contain a package of cigarettes, such as shown at 56.

With the device arranged as shown in Figure 1, the main body of the device may be employed to support bottled beverages, and the tray 45 may be employed to support sandwiches or other food articles. In the arrangement of Figure 2, the device may be employed in the same manner and an additional bottle may be supported on the device by employing the auxiliary support member 35. When it is desired to heat a bottle or a container, the heating receptacle 48 is mounted on the device and its plug 51 is connected to the jack 52 in the manner illustrated in Figure 7.

While a specific embodiment of a support device for bottled beverages and other articles for use in the passenger compartment of an automobile, as disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A support device of the character described comprising a strap member, means for securing said strap member to the interior portion of a vehicle in a substantially vertical position, said strap member being formed with spaced apertures, a tray member including a base plate, a vertical back wall and a top plate overlying the base plate, a vertical bracket member secured to the top and base plates of the said tray member and having a back wall paralleling the back wall thereof, a downwardly-directed hook member carried by the back wall of the bracket member, said hook member being formed to fit into apertures, and a pair of spaced resilient clip elements carried by said back wall of the bracket member below said hook member and being arranged to clampingly engage the side margins of said strap member.

2. A support device of the charated described comprising a strap member, means for securing said strap member to the interior portion of a vehicle in a substantially vertical position, said strap member being formed with spaced apertures, a tray member comprising a horizontal base plate, a vertical transverse partition secured to said base plate, a horizontal top plate secured to the top end of said partition, a vertical rear plate secured to the rear edges of said base plate, vertical partition and top plate, a vertical peripheral wall secured to the margin of said base plate, a vertical bracket member secured to said vertical rear plate, a downwardly-directed hook member carried by said bracket member, said hook member being formed to fit into said apertures, and a pair of spaced resilient clip elements carried by said bracket member below said hook member and being arranged to clampingly engage the side margins of said strap member.

3. In a support device of the character described, a tray member comprising a horizontal base plate, a vertical transverse partition secured to said base plate, a horizontal top plate secured to the top end of said partition, a vertical rear plate secured to the rear edges of said base plate, vertical partition and top plate, a vertical peripheral wall secured to the margin of said base plate, respective laterally and rearwardly-extending resilient clamping arms secured to the forward marginal portions of the vertical transverse partition, a vertical bracket member secured to said vertical rear plate, a downwardly-directed hook member carried by said vertical bracket member, and a pair of spaced vertical resilient coils carried by the side marginal portions of said vertical bracket member, said hook member and coils being engageable on a support for mounting the tray member in a vertical article receiving position.

4. In a support device of the character described, a tray member comprising a horizontal base plate, a vertical transverse intermediate partition secured to said base plate, a horizontal top plate secured to the top end of said partition, a vertical rear plate secured to the rear edges of said base plate, vertical partition and top plate, a vertical peripheral wall secured to the margin of said base plate, a U-shaped bracket member having a web and opposing legs, said bracket having its legs engaging on the top and base plates with the web paralleling the vertical rear plate, respective clamping arms adjacent the forward marginal portion of the vertical transverse partition, said arms overlying the base plate to engage articles seated on the base plate, a downwardly-directed hook member carried by said web of the bracket, and a pair of spaced vertical resilient coils carried by the side marginal portions of said web of the bracket with the hook member and coils being engageable on a support to detachably mount the tray member on the support.

5. An article holder comprising an elongated strap member adapted to be vertically attached to a support and having spaced apertures formed therein, a U-shaped bracket member having opposing legs and a web portion, a hook member carried by the web portion and engageable in the apertures, resilient clip elements carried by the web portion below said hook member and arranged to clampingly engage the side margins of said strap member, a tray member having a top plate and a base plate, a vertical partition wall connecting said plates, said legs of the bracket member engaging on the top and base plates with the partition wall arranged at right angles to the web portion of the bracket member.

6. An article holder comprising an elongated strap member adapted to be vertically attached to a support and having spaced apertures formed therein, a U-shaped bracket member having opposing legs and a web portion, a hook member carried by the web portion and engageable in the apertures, resilient clip elements carried by the web portion below said hook member and arranged to clampingly engage the side margins of said strap member, a tray member having a top plate and a base plate, a vertical partition wall connecting said plates, said legs of the bracket member engaging on the top and base plates with the partition wall arranged at right angles to the web portion of the bracket member, a vertical front wall connecting said top and base plates and the forward edge of the partition wall and resilient clamps carried by the opposing side edges of the front wall and extending rearwardly therefrom to overlie the base plate and engage the upper portions of articles seated on the base plate.

7. An article holder comprising an elongated strap member adapted to be vertically attached to a support and having spaced apertures formed therein, a U-shaped bracket member having opposing legs and a web portion, a hook member carried by the web portion and engageable in the apertures, resilient clip elements carried by the web portion below said hook member and arranged to clampingly engage the side margins of said strap member, a tray member having a top plate and a base plate, a vertical partition wall connecting said plates, said legs of the bracket member engaging on the top and base plates with the partition wall arranged at right angles to the web portion of the bracket member, a vertical front wall connecting said top and base plates and the forward edge of the partition wall and resilient clamps carried by the opposing side edges of the front wall and extending rearwardly therefrom to overlie the base plate and engage the upper portions of articles seated on the base plate, said base plate being formed with an upstanding marginal flange forming a compartment with the base plate to support the lower ends of articles.

JAMES A. WAGSTAFF.

REFERENCES CITED

The following references are of record in the file of this patent:

UNITED STATES PATENTS

| Number | Name | Date |
|---|---|---|
| 1,762,331 | Greist | June 10, 1930 |
| 1,980,930 | Reyniers | Nov. 13, 1934 |
| 2,294,151 | Wooten, Jr. et al. | Aug. 25, 1942 |
| 2,459,921 | Comer | Jan. 25, 1949 |

FOREIGN PATENTS

| Number | Country | Date |
|---|---|---|
| 61,190 | Denmark | Jan. 25, 1940 |